(12) United States Patent
Suzuki et al.

(10) Patent No.: US 12,393,111 B2
(45) Date of Patent: Aug. 19, 2025

(54) LIGHT SOURCE DEVICE AND PROJECTOR

(71) Applicant: SEIKO EPSON CORPORATION, Tokyo (JP)

(72) Inventors: Junichi Suzuki, Matsumoto (JP); Hidefumi Sakata, Azumino (JP); Yuichiro Iwama, Azumino (JP); Shingo Komiyama, Chino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 453 days.

(21) Appl. No.: 17/989,774

(22) Filed: Nov. 18, 2022

(65) Prior Publication Data

US 2023/0161237 A1    May 25, 2023

(30) Foreign Application Priority Data

Nov. 19, 2021  (JP) ................ 2021-188622

(51) Int. Cl.
*G03B 21/20*    (2006.01)
(52) U.S. Cl.
CPC ....... *G03B 21/204* (2013.01); *G03B 21/2013* (2013.01); *G03B 21/2066* (2013.01)
(58) Field of Classification Search
CPC ............. G03B 21/204; G03B 21/2013; G03B 21/2066; G03B 21/16; G03B 21/2073; G03B 21/208
USPC ......................................... 353/31
See application file for complete search history.

(56) References Cited

U.S. PATENT DOCUMENTS

| | | |
|---|---|---|
| 9,651,853 B2 | 5/2017 | Arakawa |
| 9,703,183 B2 | 7/2017 | Shimizu et al. |
| 2015/0204517 A1* | 7/2015 | Arakawa ........... H10H 20/8514 |
| | | 362/343 |
| 2018/0231881 A1* | 8/2018 | Akiyama ........... G03B 21/2066 |
| 2019/0302600 A1* | 10/2019 | Arakawa ........... G03B 21/2066 |
| 2022/0342136 A1 | 10/2022 | Antonis et al. |

FOREIGN PATENT DOCUMENTS

| | | |
|---|---|---|
| JP | 2015-230322 A | 12/2015 |
| JP | 2015-230760 A | 12/2015 |
| WO | WO2020/254455 A | 12/2020 |
| WO | WO2020254439 A | 12/2020 |

* cited by examiner

*Primary Examiner* — Magda Cruz
(74) *Attorney, Agent, or Firm* — Dority & Manning, P.A.

(57) ABSTRACT

A light source device according to the present disclosure includes a light emitting element for emitting first light, a wavelength conversion member for converting the first light into second light, and a support member. The wavelength conversion member has a first face and a second face crossing a longitudinal direction of the wavelength conversion member, a third face and a fourth face crossing the first face and the second face, and a fifth face and a sixth face crossing the first face and the second face and crossing the third face and the fourth face, and the second light is emitted from the first face. A light emitting surface of the light emitting element is opposed to the third face.

11 Claims, 8 Drawing Sheets

LIGHT SOURCE DEVICE AND PROJECTOR

The present application is based on, and claims priority from JP Application Serial Number 2021-188622, filed Nov. 19, 2021, the disclosure of which is hereby incorporated by reference herein in its entirety.

BACKGROUND

1. Technical Field

The present disclosure relates to a light source device and a projector.

2. Related Art

As a light source device used for a projector, there is proposed a light source device using fluorescence emitted from a phosphor when irradiating the phosphor with excitation light emitted from a light emitting element.

In International Patent Publication No. WO 2020/254455, there is disclosed a light source device provided with an excitation light source for emitting excitation light, a phosphor shaped like a rod for converting the excitation light into fluorescence, and a heat conduction member for releasing the heat generated in the phosphor. The heat conduction member is disposed so as to cover the periphery of the phosphor.

However, in the light source device described above, the excitation light emitted from the excitation light source partially enters the heat conduction member, but does not sufficiently enter the phosphor in some cases. In this case, the use efficiency of the excitation light is low, and there is a possibility that it is unachievable to obtain the fluorescence having a desired intensity.

SUMMARY

In view of the problems described above, a light source device according to an aspect of the present disclosure includes a light emitting element which has a light emitting surface, and which is configured to emit first light having a first wavelength band from the light emitting surface, a wavelength conversion member which includes a phosphor, and which is configured to convert the first light emitted from the light emitting element into second light having a second wavelength band different from the first wavelength band, and a support member configured to support the wavelength conversion member. The wavelength conversion member has a first face and a second face which cross a longitudinal direction of the wavelength conversion member, and which are located at respective sides opposite to each other, a third face and a fourth face which cross the first face and the second face, and which are located at respective sides opposite to each other, and a fifth face and a sixth face which cross the first face and the second face, and which cross the third face and the fourth face, and which are located at respective sides opposite to each other, and the second light is emitted from the first face. The light emitting surface is disposed so as to be opposed to the third face. The support member has a support surface opposed to the fourth face, and a first wall surface which is opposed to the fifth face, and which is separated from the fifth face. The first wall surface has a first portion located at the wavelength conversion member side, and a second portion located at the support surface side, the first portion extends in a direction perpendicular to the support surface, and the second portion is tilted so as to get away from the fifth face as proceeding toward the first portion from the support surface, and the second portion reflects at least a part of the first light.

A projector according to an aspect of the present disclosure includes the light source device according to the aspect of the present disclosure, a light modulation device configured to modulate light including the second light from the light source device in accordance with image information, and a projection optical device configured to project the light modulated by the light modulation device.

DESCRIPTION OF EXEMPLARY EMBODIMENTS

First Embodiment

A first embodiment of the present disclosure will hereinafter be described using FIG. 1 through FIG. 5.

A projector according to the present embodiment is an example of a projector using liquid crystal panels as light modulation devices.

In the drawings described below, constituents are shown with respective dimensional scale ratios different from each other in some cases in order to make the constituents eye-friendly.

Figure 1:
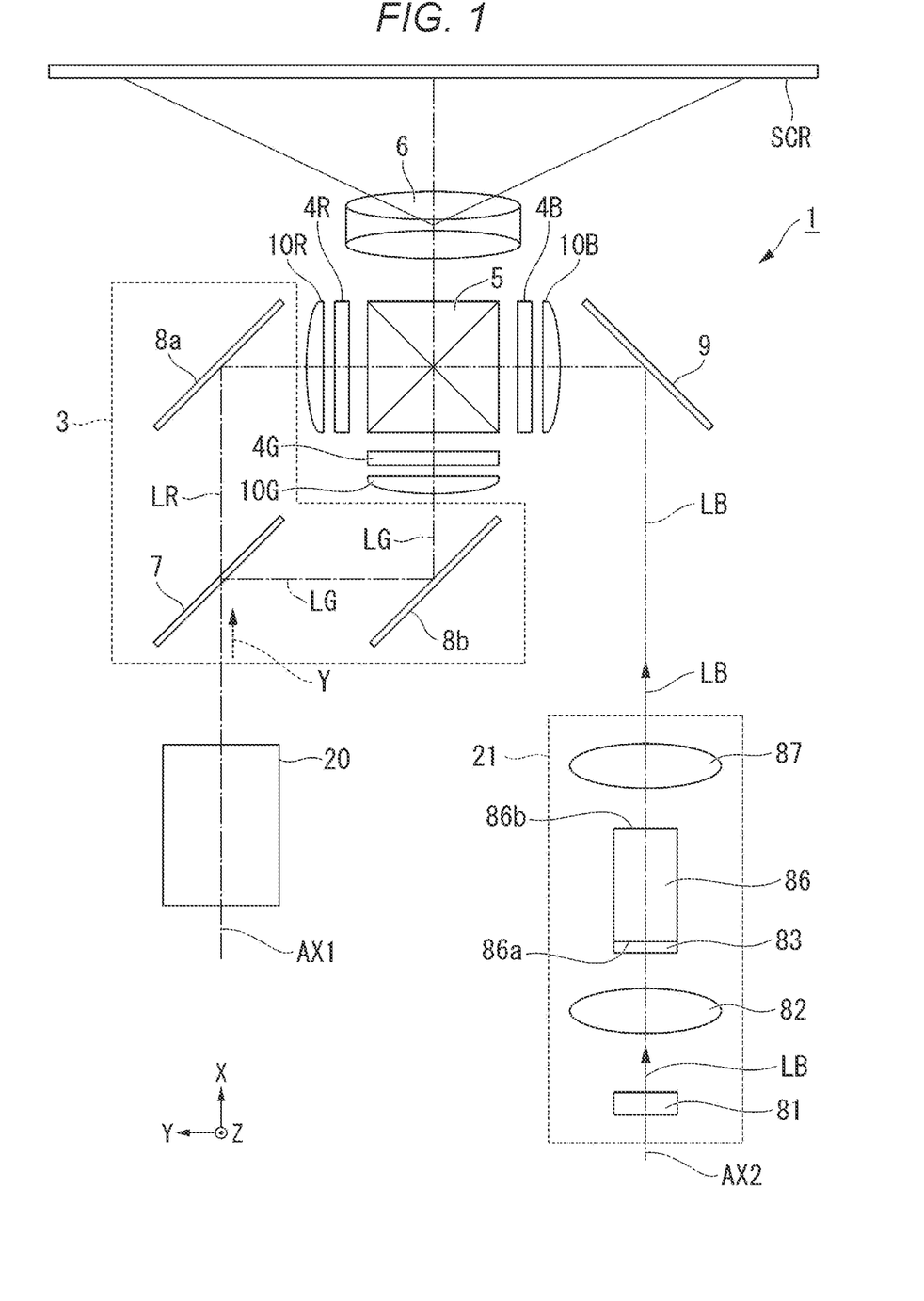
FIG. 1 is a schematic configuration diagram of a projector according to a first embodiment.

FIG. 1 is a diagram showing a schematic configuration of the projector 1 according to the present embodiment.

As shown in FIG. 1, the projector 1 according to the present embodiment is a projection-type image display device for displaying a color image on a screen (a projection target surface) SCR. The projector 1 is provided with three light modulation devices corresponding to respective colored light, namely red light LR, green light LG, and blue light LB.

The projector 1 is provided with a first illumination device 20, a second illumination device 21, a color separation optical system 3, a light modulation device 4R, a light modulation device 4G, a light modulation device 4B, a light combining element 5, and a projection optical device 6.

The first illumination device 20 emits fluorescence Y having a yellow color toward the color separation optical system 3. The second illumination device 21 emits the blue light LB toward the light modulation device 4B. The detailed configurations of the first illumination device 20 and the second illumination device 21 will be described later.

Hereinafter, in the drawings, the explanation will be presented using an XYZ coordinate system as needed. A Z axis is an axis extending along a vertical direction of the projector 1. An X axis is an axis parallel to an optical axis AX1 of the first illumination device 20 and an optical axis AX2 of the second illumination device 21. A Y axis is an axis perpendicular to the X axis and the Z axis. The optical axis AX1 of the first illumination device 20 is a central axis of the fluorescence Y emitted from the first illumination device 20. The optical axis AX2 of the second illumination device 21 is a central axis of the blue light LB emitted from the second illumination device 21.

The color separation optical system 3 separates the fluorescence Y having the yellow color emitted from the first illumination device 20 into the red light LR and the green light LG. The color separation optical system 3 is provided with a dichroic mirror 7, a first reflecting mirror 8a, and a second reflecting mirror 8b.

The dichroic mirror 7 separates the fluorescence Y into the red light LR and the green light LG. The dichroic mirror 7 transmits the red light LR, and at the same time, reflects the green light LG. The second reflecting mirror 8b is disposed in a light path of the green light LG. The second reflecting mirror 8b reflects the green light LG, which has been reflected by the dichroic mirror 7, toward the light modulation device 4G. The first reflecting mirror 8a is disposed in a light path of the red light LR. The first reflecting mirror 8a reflects the red light LR, which has been transmitted through the dichroic mirror 7, toward the light modulation device 4R.

Meanwhile, the blue light LB emitted from the second illumination device 21 is reflected by a reflecting mirror 9 toward the light modulation device 4B.

A configuration of the second illumination device 21 will hereinafter be described.

The second illumination device 21 is provided with a light source 81, a condenser lens 82, a diffuser plate 83, a rod lens 86, and a relay lens 87. The light source 81 is formed of at least one semiconductor laser. The light source 81 emits the blue light LB consisting of a laser beam. It should be noted that the light source 81 is not limited to the semiconductor laser, but can also be formed of an LED for emitting blue light.

The condenser lens 82 is formed of a convex lens. The condenser lens 82 makes the blue light LB emitted from the light source 81 enter the diffuser plate 83 in a state in which the blue light LB emitted from the light source 81 is substantially converged. The diffuser plate 83 diffuses the blue light LB emitted from the condenser lens 82 at a predetermined diffusion angle to generate a substantially homogenous light distribution substantially the same as that of the fluorescence Y emitted from the first illumination device 20. As the diffuser plate 83, there is used, for example, obscured glass made of optical glass.

The blue light LB diffused by the diffuser plate 83 enters the rod lens 86. The rod lens 86 has a prismatic shape extending along a direction of the optical axis AX2 of the second illumination device 21. The rod lens 86 has an end plane of incidence of light 86a disposed at one end, and a light exit end surface 86b disposed at the other end. The diffuser plate 83 is fixed to the end plane of incidence of light 86a of the rod lens 86 via an optical adhesive (not shown). It is desirable to make the refractive index of the diffuser plate 83 and the refractive index of the rod lens 86 coincide with each other as precise as possible.

The blue light LB is emitted from the light exit end surface 86b in the state in which homogeneity of an illuminance distribution is enhanced by propagating through the rod lens 86 while being totally reflected. The blue light LB emitted from the rod lens 86 enters the relay lens 87. The relay lens 87 makes the blue light LB enhanced in homogeneity of the illuminance distribution by the rod lens 86 enter the reflecting mirror 9.

The shape of the light exit end surface 86b of the rod lens 86 is a rectangular shape substantially similar to a shape of an image formation area of the light modulation device 4B. Thus, the blue light LB emitted from the rod lens 86 efficiently enters the image formation area of the light modulation device 4B.

The light modulation device 4R modulates the red light LR in accordance with image information to form image light corresponding to the red light LR. The light modulation device 4G modulates the green light LG in accordance with the image information to form image light corresponding to the green light LG. The light modulation device 4B modulates the blue light LB in accordance with the image information to form image light corresponding to the blue light LB.

As each of the light modulation devices 4R, 4G, and 4B, there is used, for example, a transmissive liquid crystal panel. Further, on the incident side and the exit side of each of the liquid crystal panels, there are respectively disposed polarization plates (not shown). The polarization plate transmits linearly-polarized light of a specific direction.

At the incident side of the light modulation device 4R, there is disposed a field lens 10R. At the incident side of the light modulation device 4G, there is disposed a field lens 10G. At the incident side of the light modulation device 4B, there is disposed a field lens 10B. The field lens 10R collimates a principal ray of the red light LR entering the light modulation device 4R. The field lens 10G collimates a principal ray of the green light LG entering the light modulation device 4G. The field lens 10B collimates a principal ray of the blue light LB entering the light modulation device 4B.

The light combining element 5 combines the image light corresponding respectively to the red light LR, the green light LG, and the blue light LB with each other in response to incidence of the image light respectively emitted from the light modulation device 4R, the light modulation device 4G, and the light modulation device 4B, and then emits the image light thus combined toward the projection optical device 6. As the light combining element 5, there is used, for example, a cross dichroic prism.

The projection optical device 6 is constituted by a plurality of projection lenses. The projection optical device 6 projects the image light having been combined by the light combining element 5 toward the screen SCR in an enlarged manner. Thus, an image is displayed on the screen SCR.

Figure 2:
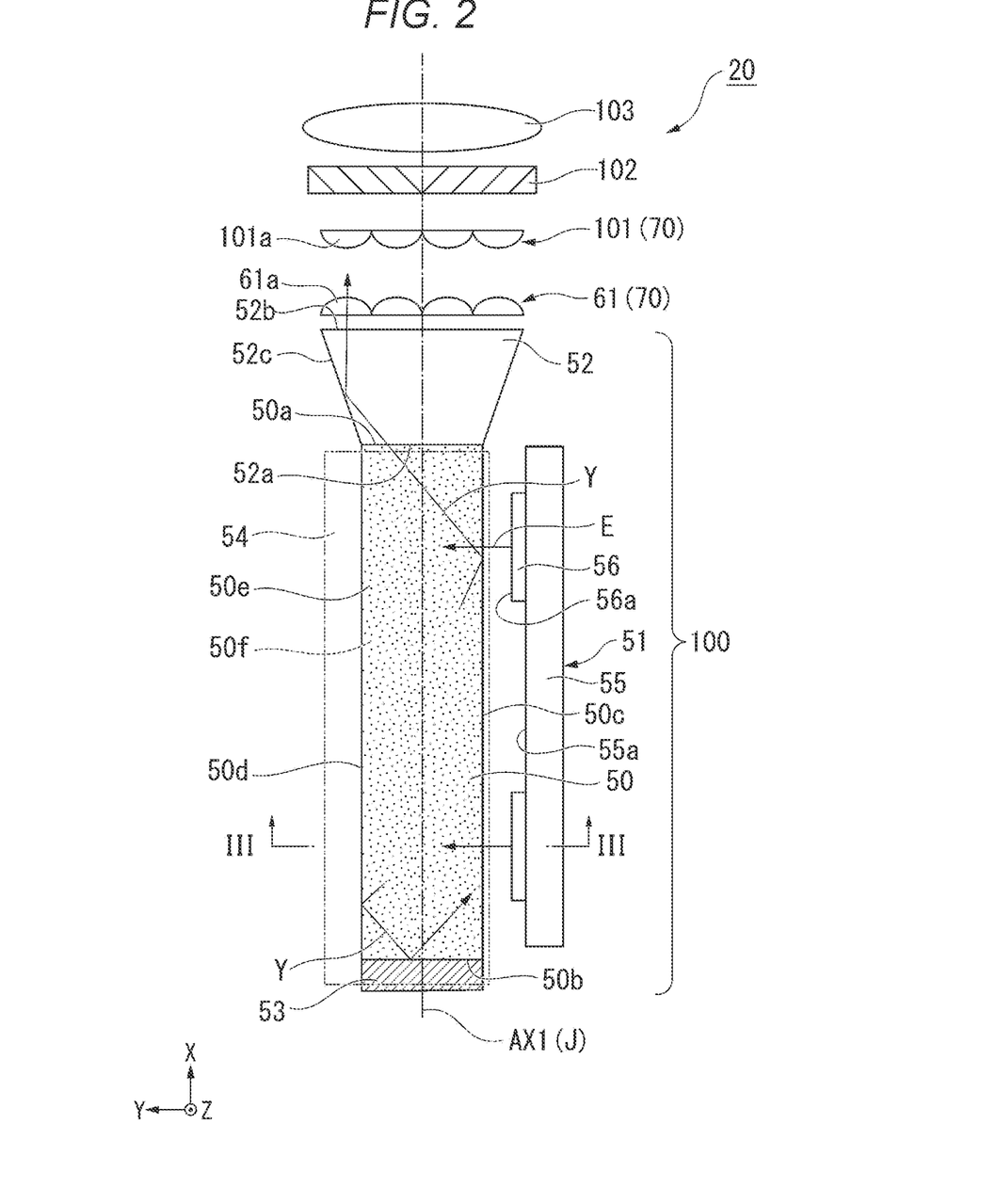
FIG. 2 is a schematic configuration diagram of a first illumination device according to the first embodiment.

A configuration of the first illumination device 20 will hereinafter be described.

FIG. 2 is a schematic configuration diagram of the first illumination device 20.

As shown in FIG. 2, the first illumination device 20 is provided with a light source device 100, an integrator optical system 70, a polarization conversion element 102, and a superimposing optical system 103.

The light source device 100 is provided with a wavelength conversion member 50, a light source 51, an angle conversion member 52, a mirror 53, and a support member 54. The light source 51 is provided with a substrate 55 and light emitting elements 56.

The wavelength conversion member 50 has a quadrangular prismatic shape extending in the X-axis direction, and has six faces. A side extending in the X-axis direction of the wavelength conversion member 50 is longer than a side extending in the Y-axis direction and a side extending in the Z-axis direction. Therefore, the X-axis direction corresponds to a longitudinal direction of the wavelength conversion member 50. The length of the side extending in the Y-axis direction and the length of the side extending in the Z-axis direction are equal to each other. In other words, a cross-sectional shape of the wavelength conversion member 50 cut by a plane perpendicular to the X-axis direction is a square. It should be noted that the cross-sectional shape of the wavelength conversion member 50 cut by the plane perpendicular to the X-axis direction can be a rectangle.

The wavelength conversion member 50 has a first face 50a and a second face 50b which cross the longitudinal direction (the X-axis direction) of the wavelength conversion member 50, and which are located at respective sides opposite to each other, a third face 50c and a fourth face 50d which cross the first face 50a and the second face 50b, and which are located at respective sides opposite to each other, and a fifth face 50e and a sixth face 50f which cross the third face 50c and the fourth face 50d, and which are located at respective sides opposite to each other. In the following description, the third face 50c, the fourth face 50d, the fifth face 50e, and the sixth face 50f are referred to as side surfaces in some cases.

The wavelength conversion member 50 includes at least a phosphor, and converts excitation light E having a first wavelength band into the fluorescence Y having a second wavelength band different from the first wavelength band. The excitation light E enters the wavelength conversion member 50 from the third face 50c. The fluorescence Y is guided inside the wavelength conversion member 50, and is then emitted from the first face 50a. The excitation light E in the present embodiment corresponds to first light in the appended claims. The fluorescence Y in the present embodiment corresponds to second light in the appended claims.

The wavelength conversion member 50 includes a ceramic phosphor made of a polycrystalline phosphor for performing the wavelength conversion on the excitation light E into the fluorescence Y. The second wavelength band which the fluorescence Y has is a yellow wavelength band of, for example, 490 through 750 nm. Therefore, the fluorescence Y is yellow fluorescence including a red light component and a green light component.

It is also possible for the wavelength conversion member 50 to include a single-crystal phosphor instead of the polycrystalline phosphor. Alternatively, the wavelength conversion member 50 can also be formed of fluorescent glass. Alternatively, the wavelength conversion member 50 can also be formed of a material obtained by dispersing a number of phosphor particles in a binder made of glass or resin. The wavelength conversion member 50 made of such a material converts the excitation light E into the fluorescence Y having the second wavelength band.

Specifically, the material of the wavelength conversion member 50 includes, for example, an yttrium aluminum garnet (YAG) phosphor. Citing YAG:Ce including cerium (Ce) as an activator agent as an example, as the material of the wavelength conversion member 50, there is used a material obtained by mixing raw powder including constituent elements such as $Y_2O_3$, $Al_2O_3$ and CeO to cause the solid-phase reaction, Y—Al—O amorphous particles obtained by a wet process such as a coprecipitation process or a sol-gel process, and YAG particles obtained by a gas-phase process such as a spray drying process, a flame heat decomposition process or a thermal plasma process.

The light source 51 is provided with the light emitting elements 56 each having a light emitting surface 56a for emitting the excitation light E in the first wavelength band. The light emitting elements 56 are each formed of, for example, a light emitting diode (LED). The light emitting surface 56a of the light emitting element 56 is opposed to the third face 50c of the wavelength conversion member 50, and emits the excitation light E toward the third face 50c. The first wavelength band is, for example, a wavelength band from a blue color to a violet color of 400 nm through 480 nm, and has a peak wavelength of, for example, 445 nm. As described above, the light source 51 is disposed so as to be opposed to the third face 50c as one of the four side surfaces along the longitudinal direction of the wavelength conversion member 50.

The substrate 55 supports the light emitting elements 56. The plurality of light emitting elements 56 is disposed on one surface 55a of the substrate 55. The light source 51 is constituted by the light emitting elements 56 and the substrate 55 in the case of the present embodiment, but can also be provided with other optical members such as a light guide plate, a diffuser plate, or a lens. Further, the number of the light emitting elements 56 is not particularly limited.

The support member 54 is disposed so as to surround the wavelength conversion member 50. The support member 54 supports the wavelength conversion member 50, and at the same time, diffuses the heat generated in the wavelength conversion member 50 to release the heat to the outside. Therefore, it is desirable for the support member 54 to be formed of a material which has predetermined strength and is high in thermal conductivity. As the material of the support member 54, there is used metal such as aluminum or stainless steel, and in particular, an aluminum alloy such as 6061 aluminum alloy is preferably used. A specific shape of the support member 54 will be described later.

The mirror 53 is provided to the second face 50b of the wavelength conversion member 50. The mirror 53 reflects the fluorescence Y which has been guided inside the wavelength conversion member 50, and has reached the second face 50b. The mirror 53 is formed of a metal film or a dielectric multilayer film formed on the second face 50b of the wavelength conversion member 50.

In the first illumination device 20, when the excitation light E emitted from the first light source 51 enters the wavelength conversion member 50, the phosphor included in the wavelength conversion member 50 is excited, and the fluorescence Y is emitted from an arbitrary light emitting point. The fluorescence Y proceeds from the arbitrary light emitting point toward all directions, but the fluorescence Y having proceeded toward one of the four side surfaces 50c, 50d, 50e, and 50f proceeds toward the first face 50a or the second face 50b while repeating total reflection at a plurality of positions on the side surfaces 50c, 50d, 50e, and 50f. The fluorescence Y proceeding toward the first face 50a enters the angle conversion member 52. The fluorescence Y having proceeded toward the second face 50b is reflected by the mirror 53, and then proceeds toward the first face 50a.

A part of the excitation light E which has not been used for the excitation of the phosphor out of the excitation light E having entered the wavelength conversion member 50 is reflected by a member on the periphery of the wavelength conversion member 50 including the light emitting element 56 of the light source 51, or the mirror 53 disposed on the second face 50b. Therefore, the part of the excitation light E is confined inside the wavelength conversion member 50 to be reused.

The angle conversion member 52 is disposed on the light exit side of the first face 50a of the wavelength conversion member 50. The angle conversion member 52 is formed of, for example, a taper rod. The angle conversion member 52 has a plane of incidence of light 52a which the fluorescence Y emitted from the wavelength conversion member 50 enters, a light exit surface 52b for emitting the fluorescence Y, and a side surface 52c for reflecting the fluorescence Y toward the light exit surface 52b.

The angle conversion member 52 has a truncated quadrangular pyramid-like shape, and the area of a cross-section perpendicular to an optical axis J increases along the proceeding direction of the light. Therefore, the area of the light exit surface 52b is larger than the area of the plane of incidence of light 52a. An axis which passes through the center of the light exit surface 52b and the center of the plane of incidence of light 52a, and is parallel to the X axis is defined as the optical axis J of the angle conversion member 52. It should be noted that the optical axis J of the angle conversion member 52 coincides with the optical axis AX1 of the first illumination device 20.

The fluorescence Y having entered the angle conversion member 52 changes the direction so as to approximate to a direction parallel to the optical axis J every time the fluorescence Y is totally reflected by the side surface 52c while proceeding inside the angle conversion member 52. In such a manner, the angle conversion member 52 converts an exit angle distribution of the fluorescence Y emitted from the first face 50a of the wavelength conversion member 50. Specifically, the angle conversion member 52 makes a maximum exit angle of the fluorescence Y in the light exit surface 52b smaller than a maximum incident angle of the fluorescence Y in the plane of incidence of light 52a.

In general, since an etendue of light defined by a product of the area of the light exit region and a solid angle (the maximum exit angle) of the light is conserved, the etendue of the fluorescence Y is also conserved before and after the transmission through the angle conversion member 52. As described above, the angle conversion member 52 in the present embodiment has the configuration in which the area of the light exit surface 52b is made larger than the area of the plane of incidence of light 52a. Therefore, from a viewpoint of the conservation of the etendue, it is possible for the angle conversion member 52 in the present embodiment to make the maximum exit angle of the fluorescence Y in the light exit surface 52b smaller than the maximum incident angle of the fluorescence Y entering the plane of incidence of light 52a.

The angle conversion member 52 is fixed to the wavelength conversion member 50 via an optical adhesive (not shown) so that the plane of incidence of light 52a is opposed to the first face 50a of the wavelength conversion member 50. Specifically, the angle conversion member 52 and the wavelength conversion member 50 have contact with each other via the optical adhesive, and no air gap (no air layer) is disposed between the angle conversion member 52 and the wavelength conversion member 50. If an air gap is disposed between the angle conversion member 52 and the wavelength conversion member 50, the fluorescence Y having entered the plane of incidence of light 52a of the angle conversion member 52 at an angle no smaller than a critical angle out of the fluorescence Y having reached the plane of incidence of light 52a is totally reflected by the plane of incidence of light 52a, and fails to enter the angle conversion member 52. In contrast, when such an air gap is not disposed between the angle conversion member 52 and the wavelength conversion member 50 as in the present embodiment, it is possible to reduce the fluorescence Y which cannot enter the angle conversion member 52. From this point of view, it is desirable to make the refractive index of the angle conversion member 52 and the refractive index of the wavelength conversion member 50 coincide with each other as precisely as possible.

It is also possible to use a compound parabolic concentrator (CPC) instead of the taper rod as the angle conversion member 52. Even when using the CPC as the angle conversion member 52, it is also possible to obtain substantially the same advantages as those when using the taper rod. It should be noted that the light source device 100 is not necessarily required to be provided with the angle conversion member 52.

The integrator optical system 70 has a first lens array 61 and a second lens array 101. The integrator optical system 70 constitutes a homogenous illumination optical system for homogenizing an intensity distribution of the fluorescence Y emitted from the light source device 100 in each of the light modulation devices 4R, 4G as the illumination target area in cooperation with the superimposing optical system 103. The fluorescence Y emitted from the light exit surface 52b of the angle conversion member 52 enters the first lens array 61. The first lens array 61 constitutes the integrator optical system 70 together with the second lens array 101 disposed in a posterior stage of the light source device 100.

The first lens array 61 has a plurality of first small lenses 61a. The plurality of first small lenses 61a is arranged in a matrix in a plane parallel to a Y-Z plane perpendicular to the optical axis AX1 of the first illumination device 20. The plurality of first small lenses 61a divides the fluorescence Y emitted from the angle conversion member 52 into a plurality of partial light beams. A shape of each of the first small lenses 61a is a rectangular shape substantially similar to a shape of each of the image formation areas of the light modulation devices 4R, 4G. Thus, each of partial light beams emitted from the first lens array 61 efficiently enters each of the image formation areas of the light modulation devices 4R, 4G.

The fluorescence Y emitted from the first lens array 61 proceeds toward the second lens array 101. The second lens array 101 is arranged so as to be opposed to the first lens array 61. The second lens array 101 has a plurality of second small lenses 101a corresponding to the plurality of first small lenses 61a of the first lens array 61. The second lens array 101 focuses an image of each of the first small lenses 61a of the first lens array 61 in the vicinity of each of the image formation areas of the light modulation devices 4R, 4G in cooperation with the superimposing optical system 103. The plurality of second small lenses 101a is arranged in a matrix in a plane parallel to the Y-Z plane perpendicular to the optical axis AX1 of the first illumination device 20.

Each of the first small lenses 61a of the first lens array 61 and each of the second small lenses 101a of the second lens array 101 have respective sizes the same as each other in the present embodiment, but can have respective sizes different from each other. Further, the first small lenses 61a of the first lens array 61 and the second small lenses 101a of the second lens array 101 are arranged at positions where respective optical axes coincide with each other in the present embodiment, but can be arranged in a state in which the axes are shifted from each other.

The polarization conversion element 102 converts the polarization direction of the fluorescence Y emitted from the second lens array 101. Specifically, the polarization conversion element 102 converts each of the partial light beams of the fluorescence Y which is divided by the first lens array 61, and is emitted from the second lens array 101 into linearly polarized light.

The polarization conversion element 102 has a polarization splitting layer (not shown) for transmitting one of the linearly polarized components included in the fluorescence Y emitted from the light source device 100 without modification while reflecting the other of the linearly polarized components toward a direction perpendicular to the optical axis AX1, a reflecting layer (not shown) for reflecting the other of the linearly polarized components reflected by the polarization splitting layer, toward a direction parallel to the optical axis AX1, and a wave plate (not shown) for converting the other of the linearly polarized components reflected by the reflecting layer into the one of the linearly polarized components.

Figure 3:
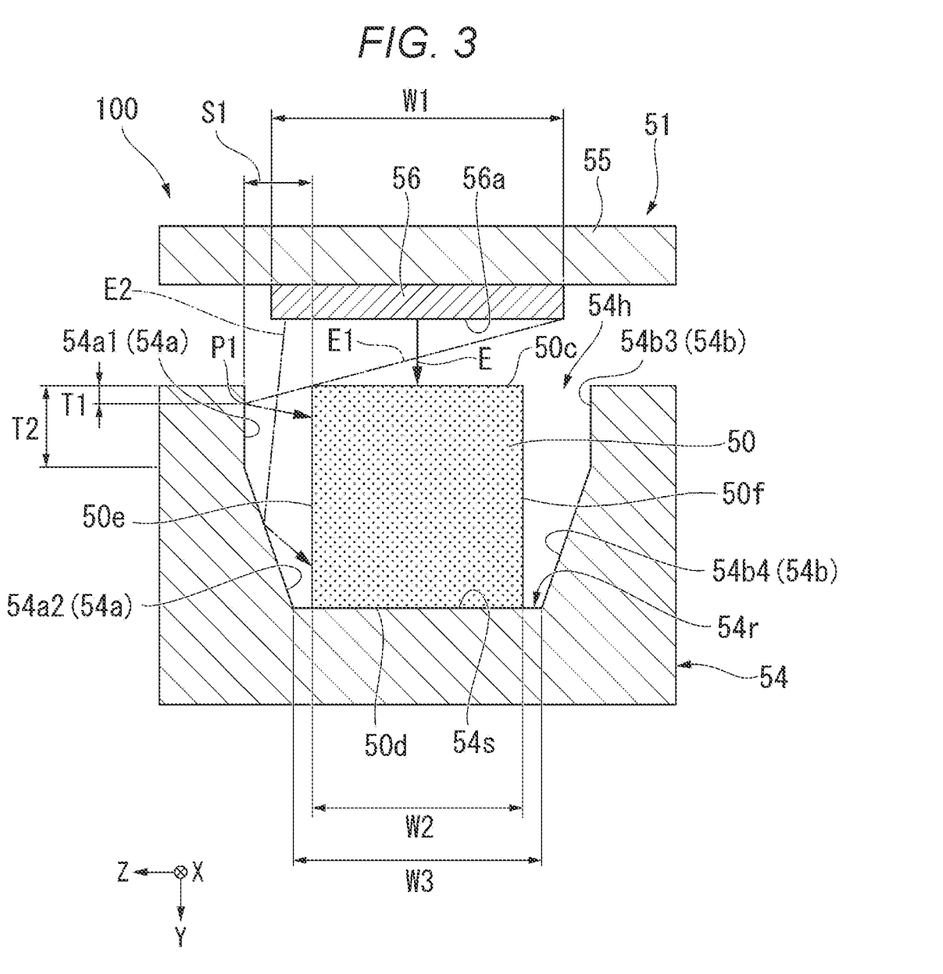
FIG. 3 is a cross-sectional view of a light source device along the line III-III shown in FIG. 2.

A cross-sectional configuration of the light source device 100 will hereinafter be described.

FIG. 3 is a cross-sectional view of the light source device 100 along a line III-III shown in FIG. 2.

As shown in FIG. 3, the support member 54 has a recess 54$h$ for housing the wavelength conversion member 50, and has a substantially U-shaped cross-sectional shape. The support member 54 has a support surface 54$s$, a first wall surface 54$a$, and a second wall surface 54$b$. The support surface 54$s$ corresponds to a bottom surface of the recess 54$h$, and is opposed to the fourth face 50$d$ of the wavelength conversion member 50. In the case of the present embodiment, the support surface 54$s$ extends in parallel to the X-Z plane.

The wavelength conversion member 50 is fixed in a state of being pressed against the support member 54 by a fixation member (not shown) such as plate springs disposed at a plurality of places on the third face 50$c$. According to this configuration, since the wavelength conversion member 50 surely adheres to the support surface 54$s$, the heat generated in the wavelength conversion member 50 is sufficiently transferred to the support member 54.

The first wall surface 54$a$ corresponds to one of the side surfaces of the recess 54$h$, and is opposed to the fifth face 50$e$ of the wavelength conversion member 50, and is separated from the fifth face 50$e$. The second wall surface 54$b$ corresponds to the other of the side surfaces of the recess 54$h$, and is opposed to the sixth face 50$f$ of the wavelength conversion member 50, and is separated from the sixth face 50$f$. In other words, a gap S1 is disposed between the first wall surface 54$a$ and the fifth face 50$e$ of the wavelength conversion member 50. The gap S1 is disposed between the second wall surface 54$b$ and the sixth face 50$f$ of the wavelength conversion member 50.

The first wall surface 54$a$ has a first portion 54$a$1 located at a side relatively far from the support surface 54$s$, and a second portion 54$a$2 located at a side relatively near to the support surface 54$s$. The first portion 54$a$1 extends in a direction perpendicular to the support surface 54$s$, namely in parallel to the X-Y plane. The second portion 54$a$2 extends in a direction tilted with respect to the support surface 54$s$. The second portion 54$a$2 is tilted in a direction of getting closer to the fifth face 50$e$ of the wavelength conversion member 50 as getting closer to a side near to the support surface 54$s$ from a side far from the support surface 54$s$. In other words, a distance between the second portion 54$a$2 and the fifth face 50$e$ at a side relatively near to the support surface 54$s$ is shorter than a distance between the second portion 54$a$2 and the fifth face 50$e$ at a side relatively near to the first portion 54$a$1. Here, the distance between the second portion 54$a$2 and the fifth face 50$e$ at the side relatively near to the support surface 54$s$ means the shortest distance between a part of the second portion 54$a$2 at the side relatively near to the support surface 54$s$ and the fifth face 50$e$. The distance between the second portion 54$a$2 and the fifth face 50$e$ at the side relatively near to the first portion 54$a$1 means the shortest distance between a part of the second portion 54$a$2 at the side relatively near to the first portion 54$a$1 and the fifth face 50$e$. In the case of the present embodiment, the second portion 54$a$2 is formed of a plane. In other words, the first wall surface 54$a$ has the first portion 54$a$1 located at the wavelength conversion member 50 side and the second portion 54$a$2 located at the support surface 54$s$ side, wherein the first portion 54$a$1 extends in a direction perpendicular to the support surface 54$s$, the second portion 54$a$2 is tilted so as to get away from the fifth face 50$e$ as proceeding toward the first portion 54$a$1 from the support surface 54$s$, and the second portion 54$a$2 reflects at least a part of the excitation light E.

The second wall surface 54$b$ has substantially the same configuration as that of the first wall surface 54$a$. Specifically, the second wall surface 54$b$ has a third portion 54$b$3 located at a side relatively far from the support surface 54$s$, and a fourth portion 54$b$4 located at a side relatively near to the support surface 54$s$. The third portion 54$b$3 extends in a direction perpendicular to the support surface 54$s$, namely in parallel to the X-Y plane. The fourth portion 54$b$4 extends in a direction tilted with respect to the support surface 54$s$. The fourth portion 54$b$4 is tilted in a direction of getting closer to the sixth face 50$f$ of the wavelength conversion member 50 as getting closer to a side near to the support surface 54$s$ from a side far from the support surface 54$s$. In other words, a distance between the fourth portion 54$b$4 and the sixth face 50$f$ at a side relatively near to the support surface 54$s$ is shorter than a distance between the fourth portion 54$b$4 and the sixth face 50$f$ at a side relatively near to the third portion 54$b$3. In the case of the present embodiment, the fourth portion 54$b$4 is formed of a plane. In other words, the second wall surface 54$b$ has the third portion 54$b$3 located at the wavelength conversion member 50 side and the fourth portion 54$b$4 located at the support surface 54$s$ side, wherein the third portion 54$b$3 extends in a direction perpendicular to the support surface 54$s$, the fourth portion 54$b$4 is tilted so as to get away from the sixth face 50$f$ as proceeding toward the third portion 54$b$3 from the support surface 54$s$, and the fourth portion 54$b$4 reflects at least a part of the excitation light E.

In the case of the present embodiment, each of the first wall surface 54$a$ and the second wall surface 54$b$ is formed of a surface of metal such as aluminum or stainless steel as the constituent material of the support member 54. More specifically, each of the first wall surface 54$a$ and the second wall surface 54$b$ is formed of a processed surface obtained by performing mirror finish on the metal surface described above. Therefore, each of the first wall surface 54$a$ and the second wall surface 54$b$ has light reflectivity, and reflects the excitation light E having entered the first wall surface 54$a$ or the second wall surface 54$b$ in good condition. It should be noted that each of the first wall surface 54$a$ and the second wall surface 54$b$ can be formed of another metal film or another dielectric multilayer film formed on a surface of metal such as aluminum or stainless steel. In the first wall surface 54$a$ and the second wall surface 54$b$, at least the second portion 54$a$2 and the fourth portion 54$b$4 need to reflect at least a part of the excitation light E.

In the present embodiment, a dimension W1 along the Z-axis direction of the light emitting surface 56$a$ of the light emitting element 56 is larger than a dimension W2 along the Z-axis direction of the wavelength conversion member 50. Thus, in the Z-axis direction, both ends of the light emitting surface 56$a$ of the light emitting element 56 protrude outside the third face 50c of the wavelength conversion member 50. Specifically, the both ends of the light emitting surface 56a of the light emitting element 56 protrude to positions where the ends respectively overlap the gap S1 between the fifth face 50e and the first wall surface 54a and the gap S1 between the sixth face 50f and the second wall surface 54b. In other words, when viewing the light emitting surface 56a from the support surface 54s along the Y-axis direction, a part of the light emitting surface 56a overlaps the third face 50c, and another part of the light emitting surface 56a overlaps the gap S1 between the fifth face 50e and the first wall surface 54a and the gap S1 between the sixth face 50f and the second wall surface 54b.

Further, when a position where the excitation light E1 passing through a corner at the +Z side of the third face 50c of the wavelength conversion member 50 and proceeding toward the first wall surface 54a enters the first wall surface 54a is defined as P1, a distance from the end at the −Y side of the first wall surface 54a to the position P1 is defined as T1. In this case, it is desirable for a dimension T2 along the Y-axis direction of the first portion 54a1 to be larger than at least the distance T1.

In the case of the present embodiment, a dimension W3 along the Z-axis direction of the support surface 54s of the support member 54 is larger than the dimension W2 along the Z-axis direction of the wavelength conversion member 50. Thus, in the Z-axis direction, both ends of the support surface 54s protrude outside the fourth face 50d of the wavelength conversion member 50. In other words, when viewing the support surface 54s from the light emitting surface 56a along the Y-axis direction, a part of the support surface 54s overlaps the fourth face 50d, and another part of the support surface 54s is exposed outside the fourth face 50d. As described above, in the present embodiment, the support surface 54s has an exposed part 54r exposed outside the wavelength conversion member 50.

COMPARATIVE EXAMPLE

Here, a light source device according to a comparative example will be described.

Figure 4:
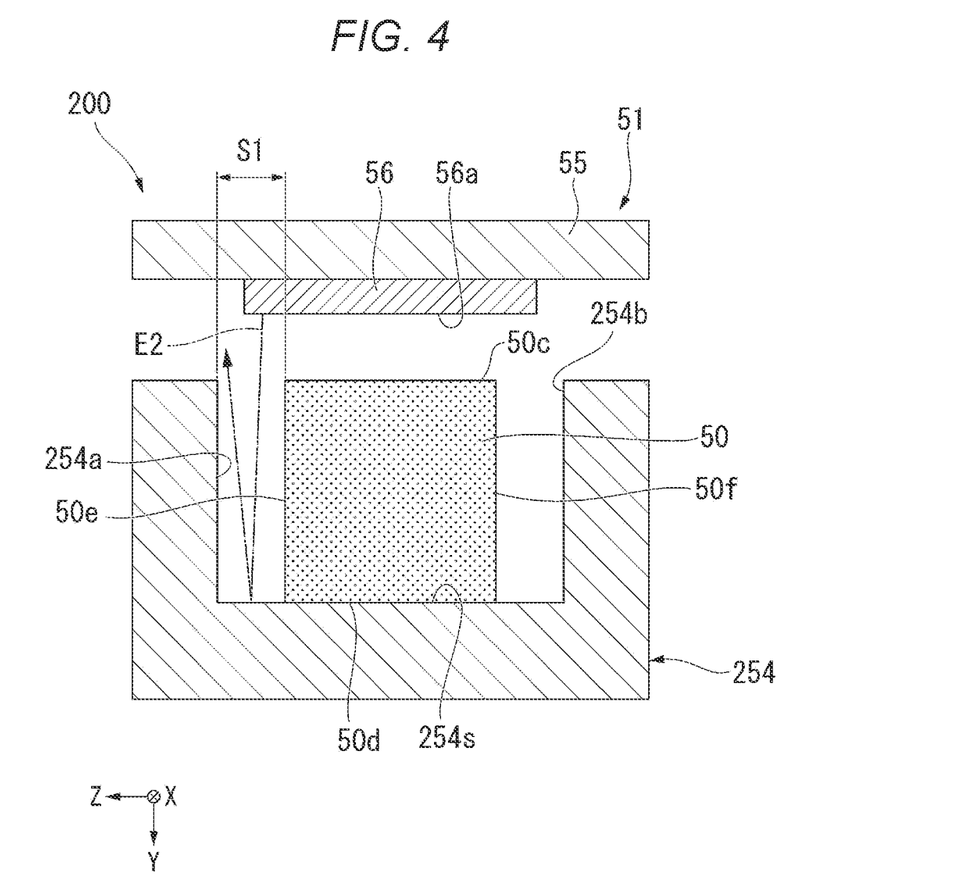
FIG. 4 is a cross-sectional view of the light source device according to a comparative example.

FIG. 4 is a cross-sectional view of the light source device 200 according to the comparative example.

As shown in FIG. 4, the light source device 200 according to the comparative example is provided with the light emitting element 56, the wavelength conversion member 50, and a support member 254. The light source device 200 according to the comparative example is different from the light source device 100 according to the present embodiment only in the configuration of the support member 254. Therefore, in FIG. 4, the light emitting element 56 and the wavelength conversion member 50 are denoted by reference numerals common to FIG. 3, and the description thereof will be omitted.

In the light source device 200 according to the comparative example, the support member 254 has a support surface 254s, a first wall surface 254a, and a second wall surface 254b. The first wall surface 254a extends in a direction perpendicular to the support surface 254s, but does not have the second portion 54a2 tilted in such a manner as in the present embodiment. Similarly, the second wall surface 254b extends in a direction perpendicular to the support surface 254s, but does not have the fourth portion 54b4 tilted in such a manner as in the present embodiment.

In the light source device of this kind, taking a production tolerance into consideration, it is common that a width of a recess in the support member for housing the wavelength conversion member is formed larger than a width of the wavelength conversion member. As a result, in the state in which the members are assembled, a gap is formed at least one of between the first wall surface and the fifth face, and between the second wall surface and the sixth face.

Further, in order to increase an amount of the excitation light which is made to enter the wavelength conversion member from the light emitting element, a light emitting element having a width larger than the width of the wavelength conversion member is used in some cases. In this case, a part of the light emitting surface of the light emitting element is located so as to protrude from the gap between the first wall surface outside the wavelength conversion member and the fifth face, and the gap between the second wall surface and the sixth face, as a result.

As a result, in the light source device 200 according to the comparative example, the excitation light E2 emitted from a part of the light emitting surface 56a enters the support surface 254s through the gap S1, and is reflected by the support surface 254s, and then returns toward the light source 51 passing through the gap S1 once again to be emitted in some cases. Such excitation light E2 does not enters the wavelength conversion member 50, and therefore does not make a contribution to the excitation of the phosphor. In this case, the use efficiency of the excitation light is low even when increasing the amount of the excitation light from the light emitting element 56, and there is a possibility that it is unachievable to obtain the fluorescence having a desired intensity.

Advantages of First Embodiment

The light source device 100 according to the present embodiment is provided with the light emitting element 56 which has the light emitting surface 56a to emit the excitation light E having the first wavelength band from the light emitting surface 56a, the wavelength conversion member 50 which includes the phosphor to convert the excitation light E emitted from the light emitting element 56 into the fluorescence Y having the second wavelength band different from the first wavelength band, and the support member 54 for supporting the wavelength conversion member 50. The wavelength conversion member 50 has the first face 50a and the second face 50b which cross the longitudinal direction of the wavelength conversion member 50, and which are located at respective sides opposite to each other, the third face 50c and the fourth face 50d which cross the first face 50a and the second face 50b, and which are located at respective sides opposite to each other, and the fifth face 50e and the sixth face 50f which cross the third face 50c and the fourth face 50d, and which are located at respective sides opposite to each other. The fluorescence Y is emitted from the first surface 50a. The light emitting surface 56a is disposed so as to be opposed to the third face 50c. The support member 54 has the support surface 54s opposed to the fourth face 50d, and the first wall surface 54a which is opposed to the fifth face 50e, and is separated from the fifth face 50e. The first wall surface 54a has the first portion 54a1 which is located at the side relatively far from the support surface 54s, and extends in the direction perpendicular to the support surface 54s, and the second portion 54a2 which is located at the side relatively near to the support surface 54s, and extends so as to be tilted with respect to the support surface 54s. The second portion 54a2 reflects at least a part of the excitation light E. The distance between the second portion 54a2 and the fifth face 50e at the side relatively near to the support surface 54s is shorter than the distance between the second portion 54a2 and the fifth face 50e at the side relatively near to the first portion 54a1, and when viewing the light emitting surface 56a from the support surface 54s, a part of the light emitting surface 56a overlaps the third face 50c, and another part of the light emitting surface 56a overlaps the gap S1 between the fifth face 50e and the first wall surface 54a.

According to the light source device 100 related to the present embodiment, as shown in FIG. 3, excitation light E2 as a part of the excitation light E emitted from the light emitting surface 56a of the light emitting element 56 proceeds through the gap S1 between the fifth face 50e of the wavelength conversion member 50 and the first portion 54a1, and then enters the second portion 54a2 tilted with respect to the support surface 54s. On this occasion, the excitation light E2 is reflected by the second portion 54a2, and then enters the fifth face 50e of the wavelength conversion member 50. Thus, it is possible to reduce the amount of the excitation light which is reflected by the support surface and then returns toward the light source as in the light source device 200 according to the comparative example.

Further, in the case of the present embodiment, the excitation light E1 which is emitted from an end at the –Z side of the light emitting surface 56a, then passes through the corner at the +Z side of the third face 50c of the wavelength conversion member 50, and then proceeds toward the first wall surface 54a is reflected by the first portion 54a1 extending perpendicularly to the support surface 54s, and then enters the fifth face 50e of the wavelength conversion member 50. Thus, it is possible to reduce the amount of the excitation light which is reflected by the first wall surface tilted, and then returns toward the light source. Further, in the case of the present embodiment, by using the light emitting element 56 larger than the wavelength conversion member 50, it is possible to sufficiently ensure the amount of the excitation light E. Thus, it is possible to increase the intensity of the fluorescence Y taken out from the light source device 100.

As described hereinabove, according to the light source device 100 related to the present embodiment, it is possible to realize the light source device 100 which is high in use efficiency of the excitation light E, and is easy to obtain the fluorescence Y having the desired intensity.

In the light source device 100 according to the present embodiment, the support member 54 further has the second wall surface 54b which is opposed to the sixth face 50f, and is separated from the sixth face 50f. The second wall surface 54b has the third portion 54b3 which is located at the side relatively far from the support surface 54s, and extends in the direction perpendicular to the support surface 54s, and the fourth portion 54b4 which is located at the side relatively near to the support surface 54s, and extends so as to be tilted with respect to the support surface 54s. The fourth portion 54b4 reflects at least a part of the excitation light E. The distance between the fourth portion 54b4 and the sixth face 50f at the side relatively near to the support surface 54s is shorter than the distance between the fourth portion 54b4 and the sixth face 50f at the side relatively near to the third portion 54b3.

According to this configuration, regarding the second wall surface 54b, there occurs substantially the same action as in the first wall surface 54a described above. Specifically, a part of the excitation light E emitted from the light emitting surface 56a of the light emitting element 56 proceeds through the gap S1 between the sixth face 50f of the wavelength conversion member 50 and the third portion 54b3, and then enters the fourth portion 54b4 tilted with respect to the support surface 54s. The excitation light E is reflected by the fourth portion 54b4, and then enters the sixth face 50f of the wavelength conversion member 50. Further, the excitation light which is emitted from an end at the +Z side of the light emitting surface 56a, then passes through the corner at the –Z side of the third face 50c of the wavelength conversion member 50, and then proceeds toward the second wall surface 54b is reflected by the third portion 54b3 extending perpendicularly to the support surface 54s, and then enters the sixth face 50f of the wavelength conversion member 50. Thus, it is possible to realize the light source device 100 which is high in use efficiency of the excitation light, and is easy to obtain the fluorescence Y having the desired intensity.

The light source device 100 according to the present embodiment is further provided with the angle conversion member for converting the angle distribution of the fluorescence Y emitted from the first face 50a of the wavelength conversion member 50.

According to this configuration, by the fluorescence Y emitted from the first face 50a of the wavelength conversion member 50 being transmitted through the angle conversion member 52, the angle distribution of the fluorescence Y is narrowed. Thus, it is possible to increase the light use efficiency in the optical system in the posterior stage of the light source device 100.

The projector 1 according to the present embodiment is equipped with the light source device 100 according to the present embodiment, and is therefore excellent in light use efficiency.

Second Embodiment

Then, a second embodiment of the present disclosure will be described using FIG. 5.

A basic configuration of a projector and a light source device according to the second embodiment is substantially the same as that in the first embodiment, and a configuration of a support member is different from that in the first embodiment. Therefore, the description of the basic configuration of the projector and the light source device will be omitted.

Figure 5:
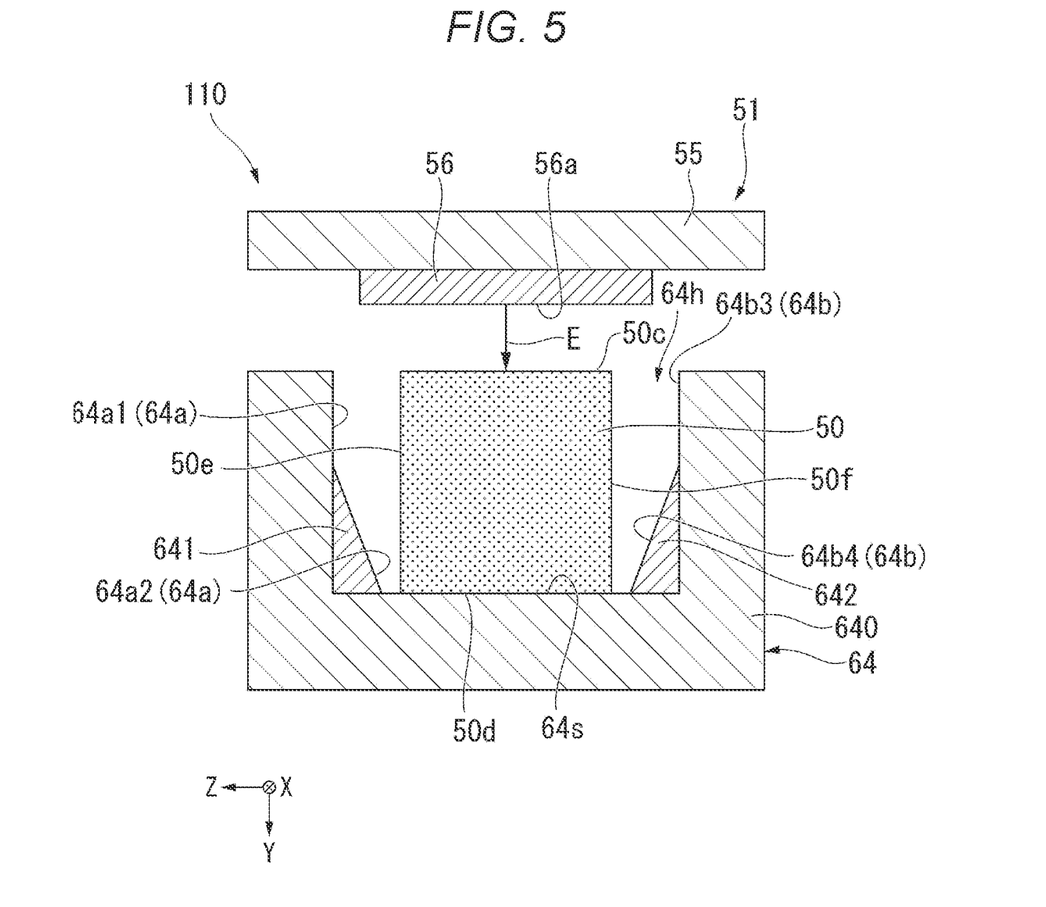
FIG. 5 is a cross-sectional view of a light source device according to a second embodiment.

FIG. 5 is a cross-sectional view of the light source device 110 according to the second embodiment.

In FIG. 5, the constituents common to the drawing used in the first embodiment are denoted by the same reference symbols, and the description thereof will be omitted.

As shown in FIG. 5, in the light source device 110 according to the present embodiment, the support member 64 has a base member 640, a first reflecting member 641, and a second reflecting member 642. The support member 64 has a support surface 64s, a first wall surface 64a, and a second wall surface 64b. The first wall surface 64a has a first portion 64a1 extending perpendicularly to the support surface 64s, and a second portion 64a2 extending obliquely to the support surface 64s. The second wall surface 64b has a third portion 64b3 extending perpendicularly to the support surface 64s, and a fourth portion 64b4 extending obliquely to the support surface 64s.

The base member 640 has a recess 64h for housing the wavelength conversion member 50. Out of two corners of the recess 64h, the first reflecting member 641 is disposed on one of the corners, and the second reflecting member 642 is disposed on the other of the corners. The base member 640 includes the support surface 64s, the first portion 64a1, and the third portion 64b3. The first reflecting member 641 includes the second portion 64a2. The second reflecting member 642 includes the fourth portion 64b4. In other words, in the support member 64 in the present embodiment, the second portion 64a2 and the fourth portion 64b4 tilted with respect to the support surface 64s are respectively formed of the reflecting members 641, 642 separated from the base member 640.

Each of the first reflecting member 641 and the second reflecting member 642 can be formed of the same material as the material of the base member 640, or can also be formed of a different material from the material of the base member 640. When each of the first reflecting member 641 and the second reflecting member 642 is formed of the same material as the material of the base member 640, it is possible to adopt a configuration in which a metal film or a dielectric multilayer film is formed on a surface of a material. The rest of the configuration of the light source device 110 is substantially the same as in the first embodiment.

Advantages of Second Embodiment

Also in the present embodiment, it is possible to obtain substantially the same advantages as in the first embodiment such as an advantage that it is possible to realize the light source device 110 which is high in use efficiency of the excitation light E, and is easy to obtain the fluorescence Y having the desired intensity.

Further, in the light source device 110 according to the present embodiment, the support member 64 has the base member 640 including the support surface 64s, the first portion 64a1, and the third portion 64b3, the first reflecting member 641 including the second portion 64a2, and the second reflecting member 642 including the fourth portion 64b4.

According to this configuration, since each of the second portion 64a2 and the fourth portion 64b4 is formed of a member separated from the base member 640, it is easy to perform a cutting work of the recess 64h to be provided to the base member 640, and the manufacturing of the light source device 110 becomes easy in some cases. Further, by forming the first reflecting member 641 and the second reflecting member 642 from the material different from the material of the base member 640, the freedom of selection of the material of the first reflecting member 641 and the second reflecting member 642 increases, and it becomes easy to control the reflectivity of the second portion 64a2 and the fourth portion 64b4.

Third Embodiment

A third embodiment of the present disclosure will hereinafter be described using FIG. 6.

A basic configuration of a projector and a light source device according to the third embodiment is substantially the same as that in the first embodiment, and a configuration of a support member is different from that in the first embodiment. Therefore, the description of the basic configuration of the projector and the light source device will be omitted.

Figure 6:
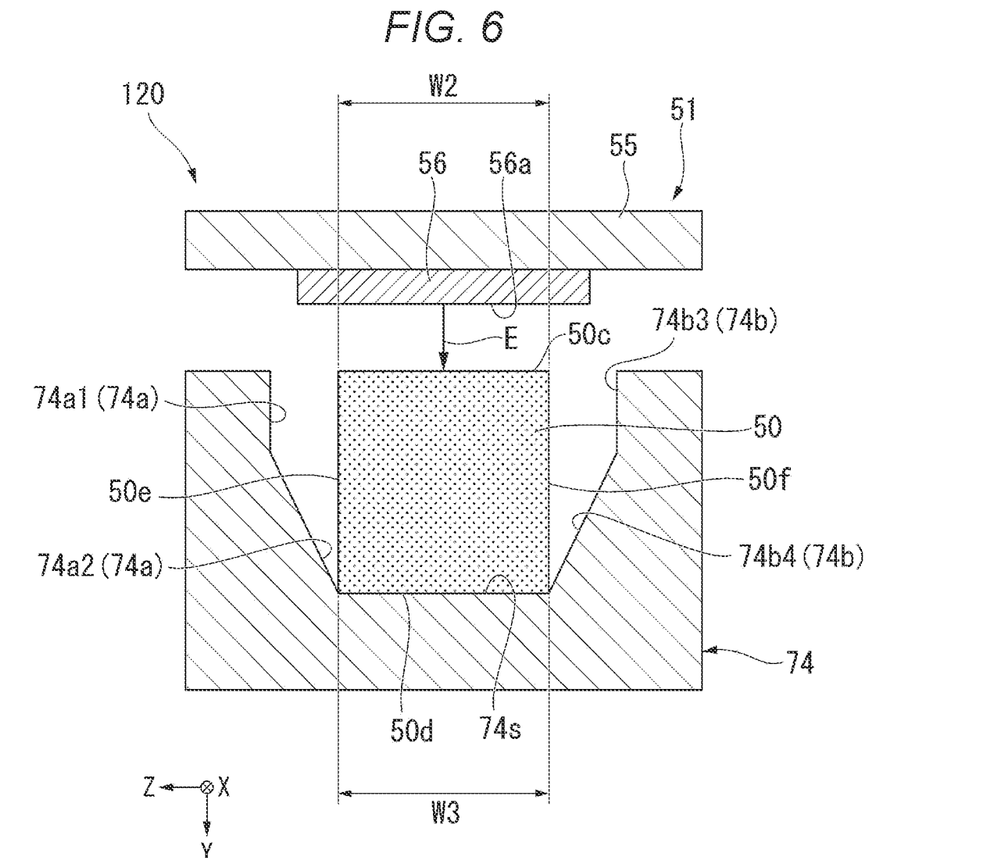
FIG. 6 is a cross-sectional view of a light source device according to a third embodiment.

FIG. 6 is a cross-sectional view of the light source device 120 according to the third embodiment.

In FIG. 6, the constituents common to the drawing used in the first embodiment are denoted by the same reference symbols, and the description thereof will be omitted.

As shown in FIG. 6, in the light source device 120 according to the present embodiment, the support member 74 has a support surface 74s, a first wall surface 74a, and a second wall surface 74b. The first wall surface 74a has a first portion 74a1 extending perpendicularly to the support surface 74s, and a second portion 74a2 extending obliquely to the support surface 74s. The second wall surface 74b has a third portion 74b3 extending perpendicularly to the support surface 74s, and a fourth portion 74b4 extending obliquely to the support surface 74s.

A dimension W3 along the Z-axis direction of the support surface 74s of the support member 74 is equal to the dimension W2 along the Z-axis direction of the third face 50c of the wavelength conversion member 50. Therefore, in the case of the present embodiment, unlike the first embodiment, the support surface 74s does not have the exposed part exposed outside the wavelength conversion member 50. The rest of the configuration of the light source device 120 is substantially the same as in the first embodiment.

Advantages of Third Embodiment

Also in the present embodiment, it is possible to obtain substantially the same advantages as in the first embodiment such as an advantage that it is possible to realize the light source device 120 which is high in use efficiency of the excitation light E, and is easy to obtain the fluorescence Y having the desired intensity.

Further, in the case of the present embodiment, since the dimension W3 along the Z-axis direction of the support surface 74s of the support member 74 coincides with the dimension W2 along the Z-axis direction of the wavelength conversion member 50, it is easy to easily perform alignment of the wavelength conversion member 50 with the support surface 74s when manufacturing the light source device 120.

Fourth Embodiment

A fourth embodiment of the present disclosure will hereinafter be described using FIG. 7.

A basic configuration of a projector and a light source device according to the fourth embodiment is substantially the same as that in the first embodiment, and a configuration of a support member is different from that in the first embodiment. Therefore, the description of the basic configuration of the projector and the light source device will be omitted.

Figure 7:
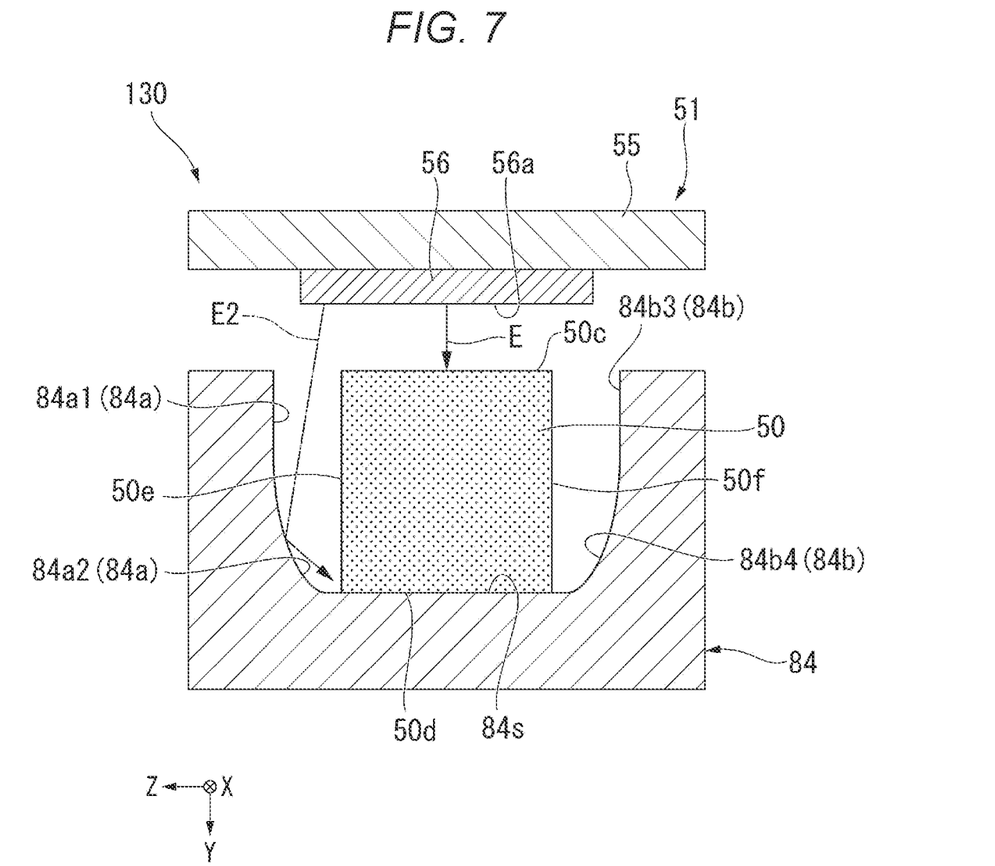
FIG. 7 is a cross-sectional view of a light source device according to a fourth embodiment.

FIG. 7 is a cross-sectional view of the light source device according to the fourth embodiment.

In FIG. 7, the constituents common to the drawing used in the first embodiment are denoted by the same reference symbols, and the description thereof will be omitted.

As shown in FIG. 7, in the light source device 130 according to the present embodiment, the support member 84 has a support surface 84s, a first wall surface 84a, and a second wall surface 84b. The first wall surface 84a has a first portion 84a1 extending perpendicularly to the support surface 84s, and a second portion 84a2 extending obliquely to the support surface 84s. The second wall surface 84b has a third portion 84b3 extending perpendicularly to the support surface 84s, and a fourth portion 84b4 extending obliquely to the support surface 84s.

In the case of the first embodiment, the second portion and the fourth portion are each formed of a plane. In contrast, in the case of the present embodiment, as shown in FIG. 7, the first portion 84a2 and the fourth portion 84b4 are each formed of an aspheric surface. In other words, each of the second portion 84a2 and the fourth portion 84b4 includes a curved surface. In should be noted that, each of the second portion 84a2 and the fourth portion 84b4 can be formed of a curved surface other than the aspheric surface such as a spherical surface. The rest of the configuration of the light source device 130 is substantially the same as in the first embodiment.

Advantages of Fourth Embodiment

Also in the present embodiment, it is possible to obtain substantially the same advantages as in the first embodiment such as an advantage that it is possible to realize the light source device 130 which is high in use efficiency of the excitation light E, and is easy to obtain the fluorescence Y having the desired intensity.

Further, in the case of the present embodiment, each of the second portion 84*a*2 and the fourth portion 84*b*4 includes a curved surface. According to this configuration, it is possible to precisely control a reflection direction of the excitation light E2 which enters each of the second portion 84*a*2 and the fourth portion 84*b*4 compared to when each of the second portion and the fourth portion is formed of a plane. Therefore, according to the present embodiment, it is easy to further increase the use efficiency of the excitation light E2.

Fifth Embodiment

A fifth embodiment of the present disclosure will hereinafter be described using FIG. 8.

A basic configuration of a projector and a light source device according to the fifth embodiment is substantially the same as that in the first embodiment, and a configuration of a support member is different from that in the first embodiment. Therefore, the description of the basic configuration of the projector and the light source device will be omitted.

Figure 8:
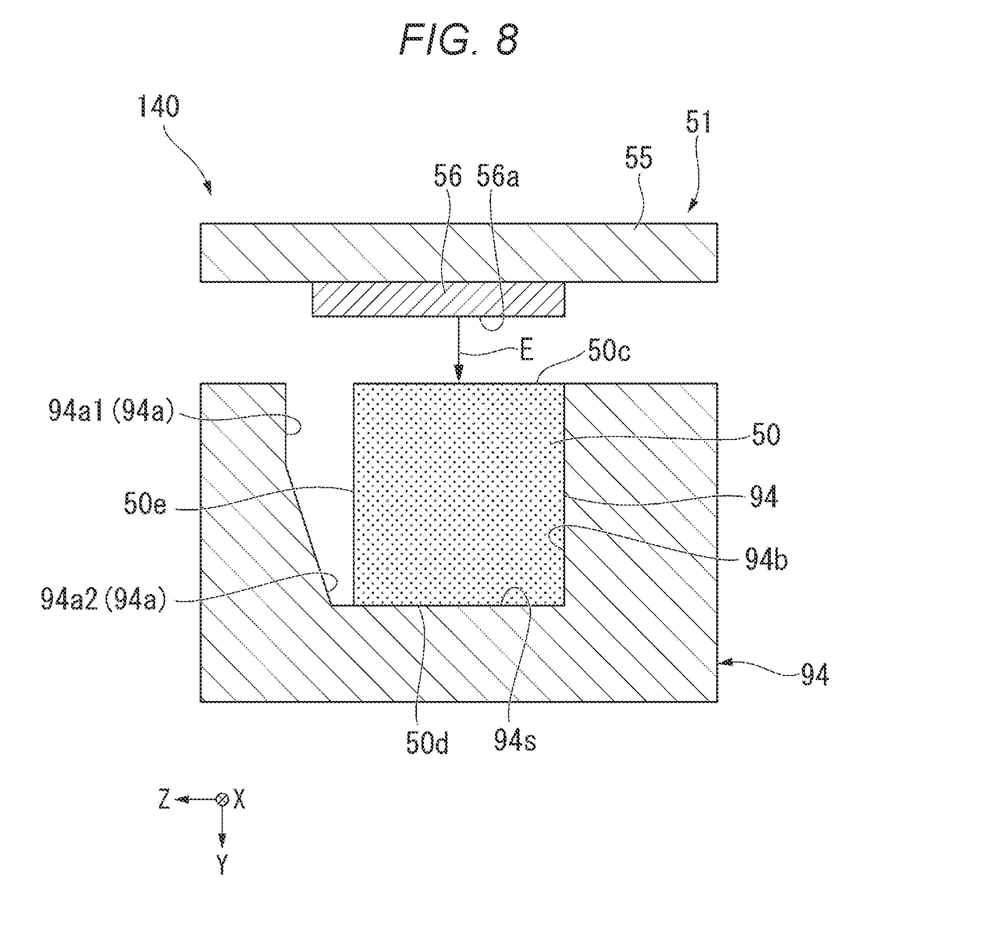
FIG. 8 is a cross-sectional view of a light source device according to a fifth embodiment.

FIG. 8 is a cross-sectional view of the light source device 140 according to the fifth embodiment.

In FIG. 8, the constituents common to the drawing used in the first embodiment are denoted by the same reference symbols, and the description thereof will be omitted.

As shown in FIG. 8, in the light source device 140 according to the present embodiment, the support member 94 has a support surface 94*s*, a first wall surface 94*a*, and a second wall surface 94*b*. Similarly to the first embodiment, the first wall surface 94*a* has a first portion 94*a*1 extending perpendicularly to the support surface 94*s*, and a second portion 94*a*2 extending obliquely to the support surface 94*s*. In contrast, the whole of the second wall surface 94*b* extends perpendicularly to the support surface 94*s* unlike the first embodiment. The second wall surface 94*b* is not separated from the sixth face 50*f* of the wavelength conversion member 50 but has contact with the sixth face 50*f*. The rest of the configuration of the light source device 140 is substantially the same as in the first embodiment.

Advantages of Fifth Embodiment

Also in the present embodiment, it is possible to obtain substantially the same advantages as in the first embodiment such as an advantage that it is possible to realize the light source device 140 which is high in use efficiency of the excitation light E, and is easy to obtain the fluorescence Y having the desired intensity.

When the power of the excitation light emitted from the light emitting element is high, since the heat generated in the wavelength conversion member becomes great, there is a possibility that the wavelength conversion efficiency decreases due to a rise in temperature of the wavelength conversion member. To cope with this problem, in the light source device 140 according to the present embodiment, since the second wall surface 94*b* of the support member 94 has contact with the sixth face 50*f*, the heat of the wavelength conversion member 50 is transferred to the support member 94 also from the second wall surface 94*b* in addition to the support surface 94*s*. Thus, it is possible to efficiently cool the wavelength conversion member 50, and it is possible to ensure the wavelength conversion efficiency.

It should be noted that the scope of the present disclosure is not limited to the embodiments described above, and a variety of modifications can be provided thereto within the scope or the spirit of the present disclosure. Further, one aspect of the present disclosure can be provided with a configuration obtained by arbitrarily combining characterizing portions of the respective embodiments described above with each other.

For example, in the light source devices according to the embodiments described above, the dimension along the Z-axis direction of the light emitting surface of the light emitting element is larger than the dimension along the Z-axis direction of the third face of the wavelength conversion member. It should be noted that the dimension along the Z-axis direction of the light emitting surface of the light emitting element can be equal to the dimension along the Z-axis direction of the third face of the wavelength conversion member, or can also be smaller than the dimension along the Z-axis direction of the third face of the wavelength conversion member.

Besides the above, the specific descriptions of the shape, the number, the arrangement, the material, and so on of the constituents of the light source device and the projector are not limited to those in the embodiments described above, and can arbitrarily be modified. Further, although in the embodiments described above, there is described the example of installing the light source device according to the present disclosure in the projector using the liquid crystal panels, the example is not a limitation. The light source device according to the present disclosure can also be applied to a projector using digital micromirror devices as the light modulation devices. Further, the projector is not required to have a plurality of light modulation devices, and can be provided with just one light modulation device.

Although in the embodiments described above, there is described the example of applying the light source device according to the present disclosure to the projector, the example is not a limitation. The light source device according to the present disclosure can also be applied to lighting equipment, a headlight of a vehicle, and so on.

A light source device according to an aspect of the present disclosure may have the following configuration.

The light source device according to an aspect of the present disclosure includes a light emitting element which has a light emitting surface, and which is configured to emit first light having a first wavelength band from the light emitting surface, a wavelength conversion member which includes a phosphor, and which is configured to convert the first light emitted from the light emitting element into second light having a second wavelength band different from the first wavelength band, and a support member configured to support the wavelength conversion member, wherein the wavelength conversion member has a first face and a second face which cross a longitudinal direction of the wavelength conversion member, and which are located at respective sides opposite to each other, a third face and a fourth face which cross the first face and the second face, and which are located at respective sides opposite to each other, and a fifth face and a sixth face which cross the third face and the fourth face, and which are located at respective sides opposite to each other, and emits the second light from the first face, the light emitting surface is disposed so as to be opposed to the third face, the support member has a support surface opposed to the fourth face, and a first wall surface which is opposed to the fifth face, and which is separated from the fifth face, the first wall surface has a first portion located at the wavelength conversion member side, and a second portion located at the support surface side, the first portion extends in a direction perpendicular to the support surface, and the second portion is tilted so as to get away from the fifth face as proceeding toward the first portion from the support surface, and the second portion reflects at least a part of the first light.

In the light source device according to the aspect of the present disclosure, there may be adopted a configuration in which when viewing the light emitting surface from the support surface, a part of the light emitting surface overlaps the third face, and another part of the light emitting surface overlaps a gap between the fifth face and the first wall surface.

In the light source device according to the aspect of the present disclosure, there may be adopted a configuration in which the second portion includes a curved surface.

In the light source device according to the aspect of the present disclosure, there may be adopted a configuration in which the support member has a base member including the support surface and the first portion, and a first reflecting member including the second portion.

In the light source device according to the aspect of the present disclosure, there may be adopted a configuration in which the support member further has a second wall surface which is opposed to the sixth face, and which is separated from the sixth face, the second wall surface has a third portion located at the wavelength conversion member side, and a fourth portion located at the support surface side, the third portion extends in a direction perpendicular to the support surface, and the fourth portion is tilted so as to get away from the sixth face as proceeding toward the third portion from the support surface, and the fourth portion reflects at least a part of the first light.

In the light source device according to the aspect of the present disclosure, there may be adopted a configuration in which the first portion and the third portion are planes, the second portion and the fourth portion are planes, and a following conditional expression (1) is fulfilled $$W1 < W2 < W3 \quad (1)$$

wherein in a cross-sectional view connecting the first wall surface and the second wall surface to each other, W1 is a width of the light emitting surface, W2 is a width between the fifth face and the sixth face in a portion having contact with the support surface in the wavelength conversion member, and W3 is a width of a space between a coupling part of the support surface and the third portion, and a coupling part of the support surface and the fourth portion.

In the light source device according to the aspect of the present disclosure, there may be adopted a configuration in which the fourth portion includes a curved surface.

In the light source device according to the aspect of the present disclosure, there may be adopted a configuration in which the support member has a base member including the support surface and the third portion, and a second reflecting member including the fourth portion.

In the light source device according to the aspect of the present disclosure, there may be adopted a configuration in which the support member further has a second wall surface having contact with the sixth face.

In the light source device according to the aspect of the present disclosure, there may be adopted a configuration in which when viewing the light emitting surface from the support surface, a part of the light emitting surface overlaps the third face, and another part of the light emitting surface overlaps a gap between the fifth face and the first wall surface.

In the light source device according to the aspect of the present disclosure, there may be adopted a configuration in which there is further included an angular conversion member configured to convert an angle distribution of the second light emitted from the first face.

A projector according to an aspect of the present disclosure may have the following configuration.

The projector according to an aspect of the present disclosure includes the light source device according to the aspect of the present disclosure, a light modulation device configured to modulate light including the second light emitted from the light source device in accordance with image information, and a projection optical device configured to project the light modulated by the light modulation device.

What is claimed is:

1. A light source device comprising:
    a light emitting element which has a light emitting surface, and which is configured to emit first light having a first wavelength band from the light emitting surface;
    a wavelength conversion member which includes a phosphor, and which is configured to convert the first light emitted from the light emitting element into second light having a second wavelength band different from the first wavelength band; and
    a support member configured to support the wavelength conversion member, wherein
    the wavelength conversion member has a first face and a second face which cross a longitudinal direction of the wavelength conversion member, and which are located at respective sides opposite to each other, a third face and a fourth face which cross the first face and the second face, and which are located at respective sides opposite to each other, and a fifth face and a sixth face which cross the first face and the second face, and which cross the third face and the fourth face, and which are located at respective sides opposite to each other, and emits the second light from the first face,
    the light emitting surface is disposed so as to be opposed to the third face,
    the support member has a support surface opposed to the fourth face, and a first wall surface which is opposed to the fifth face, and which is separated from the fifth face,
    the first wall surface has a first portion located at the wavelength conversion member side, and a second portion located at the support surface side,
    the first portion extends in a direction perpendicular to the support surface, and
    the second portion is tilted so as to get away from the fifth face as proceeding toward the first portion from the support surface, and the second portion reflects at least a part of the first light.

2. The light source device according to claim 1, wherein the second portion includes a curved surface.

3. The light source device according to claim 1, wherein the support member has a base member including the support surface and the first portion, and a first reflecting member including the second portion.

4. The light source device according to claim 1, wherein
the support member further has a second wall surface which is opposed to the sixth face, and which is separated from the sixth face,
the second wall surface has a third portion located at the wavelength conversion member side, and a fourth portion located at the support surface side,
the third portion extends in a direction perpendicular to the support surface, and
the fourth portion is tilted so as to get away from the sixth face as proceeding toward the third portion from the support surface, and the fourth portion reflects at least a part of the first light.

5. The light source device according to claim 4, wherein
the first portion and the third portion are planes,
the second portion and the fourth portion are planes, and
a following conditional expression (1) is fulfilled, $$W1<W2<W3 \qquad (1)$$

wherein in a cross-sectional view connecting the first wall surface and the second wall surface to each other,
W1 is a width of the light emitting surface,
W2 is a width between the fifth face and the sixth face in a portion having contact with the support surface in the wavelength conversion member, and
W3 is a width of a space between a coupling part of the support surface and the third portion, and a coupling part of the support surface and the fourth portion.

6. The light source device according to claim 5, wherein the fourth portion includes a curved surface.

7. The light source device according to claim 5, wherein the support member has a base member including the support surface and the third portion, and a second reflecting member including the fourth portion.

8. The light source device according to claim 1, wherein the support member further has a second wall surface having contact with the sixth face.

9. The light source device according to claim 1, wherein when viewing the light emitting surface from the support surface, a part of the light emitting surface overlaps the third face, and another part of the light emitting surface overlaps a gap between the fifth face and the first wall surface.

10. The light source device according to claim 1, further comprising:
an angular conversion member configured to convert an angle distribution of the second light emitted from the first face.

11. A projector comprising:
the light source device according to claim 1;
a light modulation device configured to modulate light including the second light emitted from the light source device in accordance with image information; and
a projection optical device configured to project the light modulated by the light modulation device.

* * * * *